United States Patent [19]

Litkouhi

[11] Patent Number: 5,058,019
[45] Date of Patent: Oct. 15, 1991

[54] VEHICLE SPEED ESTIMATION USING WHEEL SPEED MEASUREMENTS

[75] Inventor: Bakhtiar Litkouhi, Troy, Mich.

[73] Assignee: General Motors Corporation, Detroit, Mich.

[21] Appl. No.: 470,186

[22] Filed: Jan. 25, 1990

[51] Int. Cl.$^5$ ............................................. B60T 8/60
[52] U.S. Cl. .............................. 364/426.02; 364/565; 303/100
[58] Field of Search .................... 364/426.02, 565; 303/95–100; 180/197

[56] References Cited

U.S. PATENT DOCUMENTS

| | | | |
|---|---|---|---|
| 4,485,545 | 11/1984 | Braschel | 303/55 |
| 4,673,226 | 6/1987 | Every et al. | 303/109 |
| 4,755,946 | 7/1988 | Lin | 364/426.02 |
| 4,783,127 | 11/1988 | Kade et al. | 303/100 |
| 4,859,002 | 8/1989 | Yoshino | 303/103 |
| 4,933,858 | 6/1990 | Matsuda | 364/426.02 |

*Primary Examiner*—Thomas G. Black
*Attorney, Agent, or Firm*—Howard N. Conkey

[57] ABSTRACT

A vehicle speed estimation system estimates vehicle speed from wheel speed prior to an incipient wheel lockup condition. When an incipient wheel lockup condition is sensed, the estimated speed is increased by a determined amount and then decreased based on an estimated vehicle deceleration. The estimated vehicle deceleration during the incipient wheel lockup condition is based on wheel deceleration at a time preceding the time the incipient wheel lockup condition is sensed. When in incipient wheel lockup condition is sensed, a forgetting period during which wheel deceleration is not representative of vehicle deceleration is determined. The estimated vehicle deceleration during the incipient wheel lock condition is then based on wheel deceleration prior to the forgetting period.

5 Claims, 3 Drawing Sheets

VEHICLE SPEED ESTIMATION USING WHEEL SPEED MEASUREMENTS

BACKGROUND OF THE INVENTION

This invention relates to a method of estimating the speed of a vehicle using wheel speed measurements including during incipient wheel lock conditions while the vehicle is being braked.

Wheel slip is a measure of the relative difference between vehicle speed and wheel speed. This parameter is used in antilock brake control systems and in traction control systems in determining when and whether to take corrective action in presenting excessive wheel slip. Since wheel slip is a measure of the relative difference between vehicle speed and wheel speed, any inaccuracies in the determination of the vehicle speed will result in inaccuracies in the calculated wheel slip which in turn may degrade overall system performance. Accordingly, it is desirable that the antilock brake system controller have an accurate indication of the vehicle speed.

Various methods have been proposed to determine vehicle speed. Some of these proposed methods involve the use of auxiliary devices such as vehicle body accelerometers, sonar vehicle speed sensors or radar speed sensors. However, these auxiliary devices add substantially to system complexity and cost.

Other proposed methods avoid this complexity and cost by estimating vehicle speed solely on wheel speed information and predetermined vehicle deceleration limits. In some of these methods, the vehicle speed follows wheel speed until an incipient wheel lockup condition is detected after which the vehicle speed is estimated based on a constant speed gradient represented by a predetermined vehicle deceleration limit. However, inaccuracies may be introduced by this method as a result of variations in the actual vehicle deceleration limit as a function of the road surface condition. For example, the deceleration attainable by braking a vehicle on a dry road bed may be substantially greater than the maximum possible vehicle deceleration obtainable on other surfaces such as gravel, snow, or a wet road bed. In addition, the wheel slip when an incipient wheel lockup condition occurs during braking may already be significant such that the wheel speed is not representative of the actual vehicle speed at the time of occurrence of the incipient wheel lockup condition.

SUMMARY OF THE INVENTION

It is the general object of this invention to provide for an improved method of estimating the vehicle speed which provides an accurate estimation of the vehicle speed even during incipient wheel lockup conditions.

In general, the subject invention recognizes that wheel deceleration is not representative of actual vehicle deceleration at the time an incipient wheel lockup condition is sensed while the wheel is being braked. This invention provides for an estimation of the actual vehicle deceleration based on wheel deceleration at a time preceding the time an incipient wheel lockup condition is sensed. This prior time at which the wheel deceleration is representative of vehicle deceleration may be estimated based on various predetermined vehicle, braking and wheel speed parameters. Accordingly, when an incipient wheel lockup condition is sensed, the subject invention determines a forgetting period during which wheel deceleration is not representative of vehicle deceleration. The vehicle deceleration is then based on the prior time determined by the forgetting period to establish the gradient or decrease in vehicle speed during the incipient wheel lockup condition.

In a further aspect of this invention, the estimated vehicle speed accuracy is further improved by the recognition of the fact that when an incipient wheel lockup condition is sensed, the estimation of vehicle speed based on wheel speed results in an estimated vehicle speed substantially lower than the actual vehicle speed as a result of wheel slip. To correct for this low vehicle speed estimate, the estimated vehicle speed is increased by a determined amount. This amount may be a predetermined percentage in one embodiment or in another embodiment as a function of predetermined parameters such as the length of the forgetting period used for determining an estimated value of vehicle deceleration and upon the average wheel deceleration during this period.

DESCRIPTION OF THE DRAWINGS

The invention may be best understood by reference to the following description of a preferred embodiment and the drawings in which:

Referring to FIG. 1, there is illustrated a general overview of a digital computer based antilock brake control system for modulating the pressure applied to the brakes of the vehicle wheels for preventing wheel lockup during braking of the vehicle.

Figure 1:
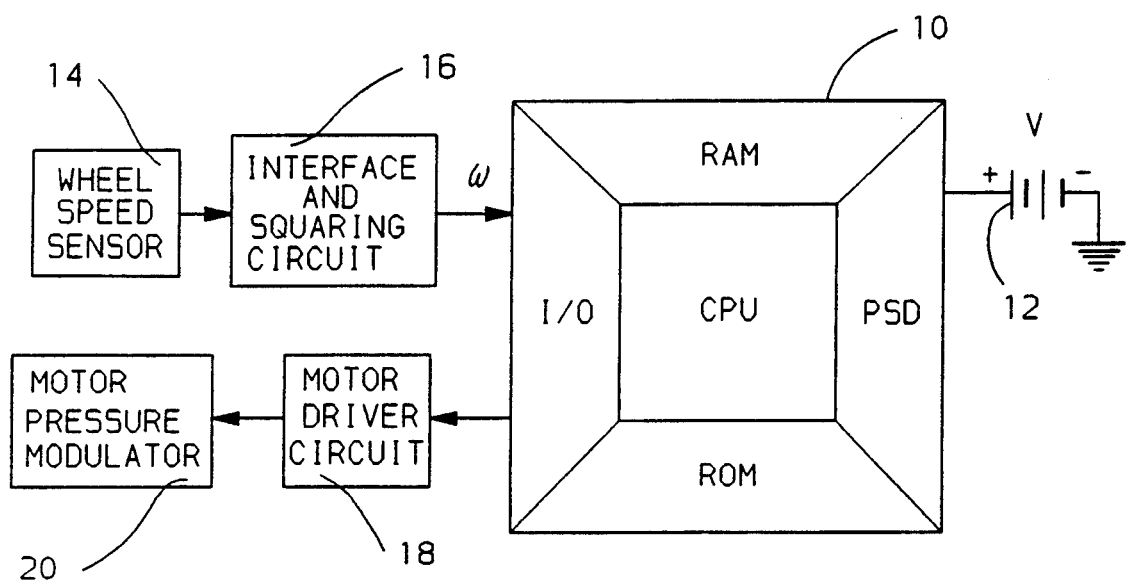
FIG. 1 is a diagram of a digital computer based antilock brake control system which provides for an estimation of vehicle speed in accord with the principles of this invention.

The system includes a conventional digital computer 10 that includes a central processing unit (CPU) which executes an operating program permanently stored in a read-only memory (ROM) which also stores tables and calibration constants utilized in monitoring the vehicle wheel speeds and for modulating the pressure applied to the brakes of each of the vehicle wheels. The computer 10 also includes a random access memory (RAM) into which data may be temporarily stored and from which data may be read at various address locations determined in accord with the program stored in the ROM. A power supply device (PSD) is provided which interfaces the computer 10 with the vehicle power system including the vehicle battery 12 providing a supply voltage V.

An input/output circuit (I/O) serves as an interface between the digital computer 10 and external devices. Included in these external devices are conventional wheel speed sensing and interface circuits providing information relating to the speed of each of the vehicle wheels. Such circuits for one of the vehicle wheels is illustrated, it being understood that identical circuits are provided for each of the remaining wheels of the vehicle. Wheel speed information for each wheel is provided by a wheel speed sensor 14 which generates a sinusoidal waveform having a frequency directly proportional to wheel speed. This waveform is provided to an interface and squaring circuit 16 whose output is a square wave signal having a frequency directly proportional to wheel speed $\omega$.

The digital computer 10 responds to the wheel speed signals to modulate the pressure applied to the brakes of the various vehicle wheels when an incipient wheel lockup condition is sensed at the respective wheel. Again, elements for modulating the pressure to a single wheel is illustrated. It is understood that identical elements are provided for the remaining wheels of the vehicle. Pressure modulation is accomplished by providing current control commands via the I/O to a motor driver circuit 18 which controls a motor driven pressure modulator 20 to regulate the applied pressure to the wheel brake. An example of the motor driven pressure modulator for controlling the vehicle brakes may be found in U.S. patent to Salman U.S. Pat. No. 4,828,334 which issued May 9, 1989 and which is assigned to the assignee of this invention.

The leading edge of each of the squarewave signals from the wheel speed sensors functions as an interrupt request to the digital computer 10 which responds thereto to execute a wheel speed interrupt routine stored in the ROM. This interrupt routine functions to estimate the vehicle speed for each wheel which is utilized in regulating the pressure applied to the wheel brake for preventing wheel lockup.

Figure 2:
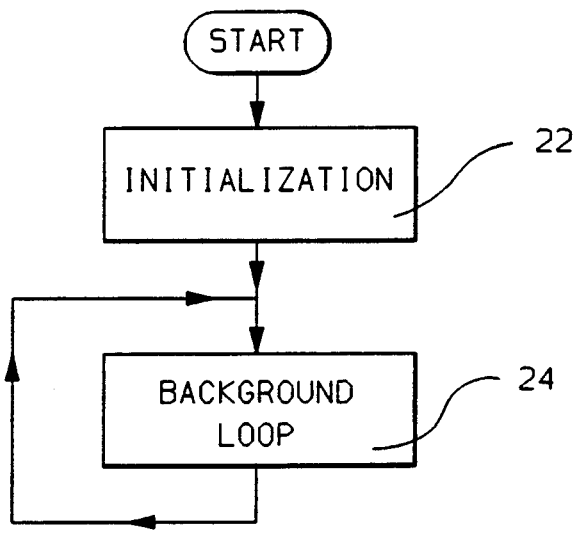
FIGS. 2 and 3 are flow diagrams depicting the operation of the system of FIG. 1 in carrying out the principles of this invention.

When operating voltage is first applied to the digital computer 10 such as by operation of the vehicle ignition switch or other means, the digital computer 10 will begin executing the instructions encoded in the ROM. As illustrated in FIG. 2, the computer 10 first performs system initialization at step 22 which entails clearing registers, initializing specific RAM variables to calibrated values, stabilizing voltage levels at the I/O and other basic functions of the digital computer. Once the initialization step has been completed, the program enables interrupts to occur and proceeds to execute a background loop 24 which is continuously repeated. This loop may include, for example, diagnostic routines. This background loop is interrupted in response to each leading edge of the squarewave speed signals at which time the wheel speed interrupt routine is executed. Additional interrupts may be provided. For example, a time based interrupt may be provided for interrupting the background loop 22 at predetermined time intervals such as 10 milliseconds for executing an antilock brake control routine or other control routines.

Figure 3:
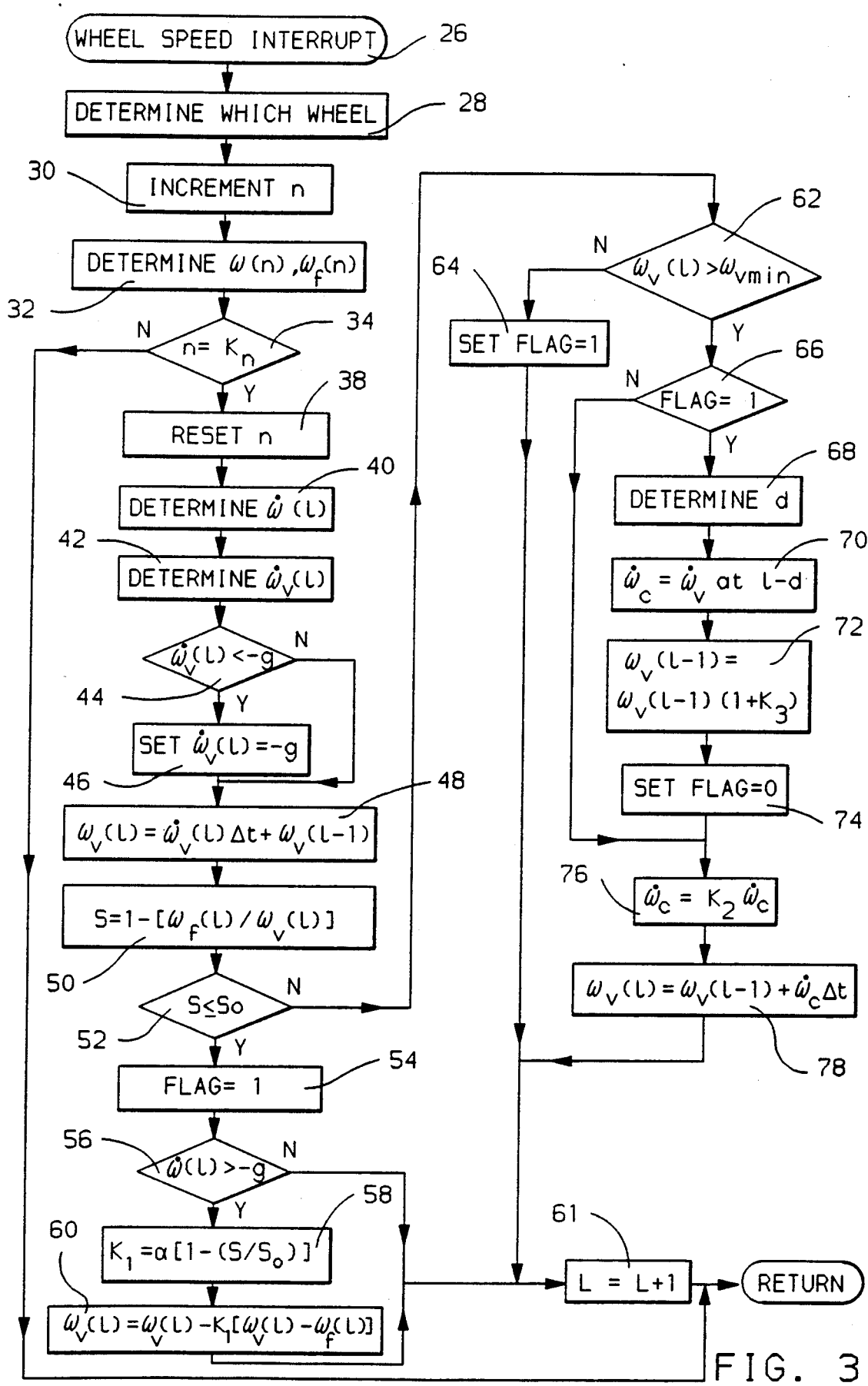

The wheel speed interrupt routine executed upon the sensing of the leading edge of any of the squarewave speed signals is illustrated in FIG. 3. As previously described, this wheel speed interrupt routine determines or estimates vehicle speed for each wheel.

The wheel speed interrupt routine is entered at step 26 and proceeds to a step 28 which determines which of the four wheel speed signals initiated the wheel speed interrupt routine. Once determined, the remaining portion of the routine utilizes and determines parameters associated with that determined wheel. For example, previously determined values associated with that wheel are utilized in establishing new values for estimating vehicle speed. Hereafter, the parameters referred to relate to that selected wheel.

The program next executes a series of steps to provide an estimation of the deceleration of the wheel determined at step 28. In this embodiment, the deceleration estimate is based upon a predetermined number $K_n$ of filtered measurements of wheel speed $\omega_f$ which defines an updating time cycle ending at time 1. In one embodiment, $K_n$ is equal to 6. Wheel deceleration is then based upon a least squares fit of the n sampled measurements of filtered wheel speed $\omega_f$.

Figure 4:
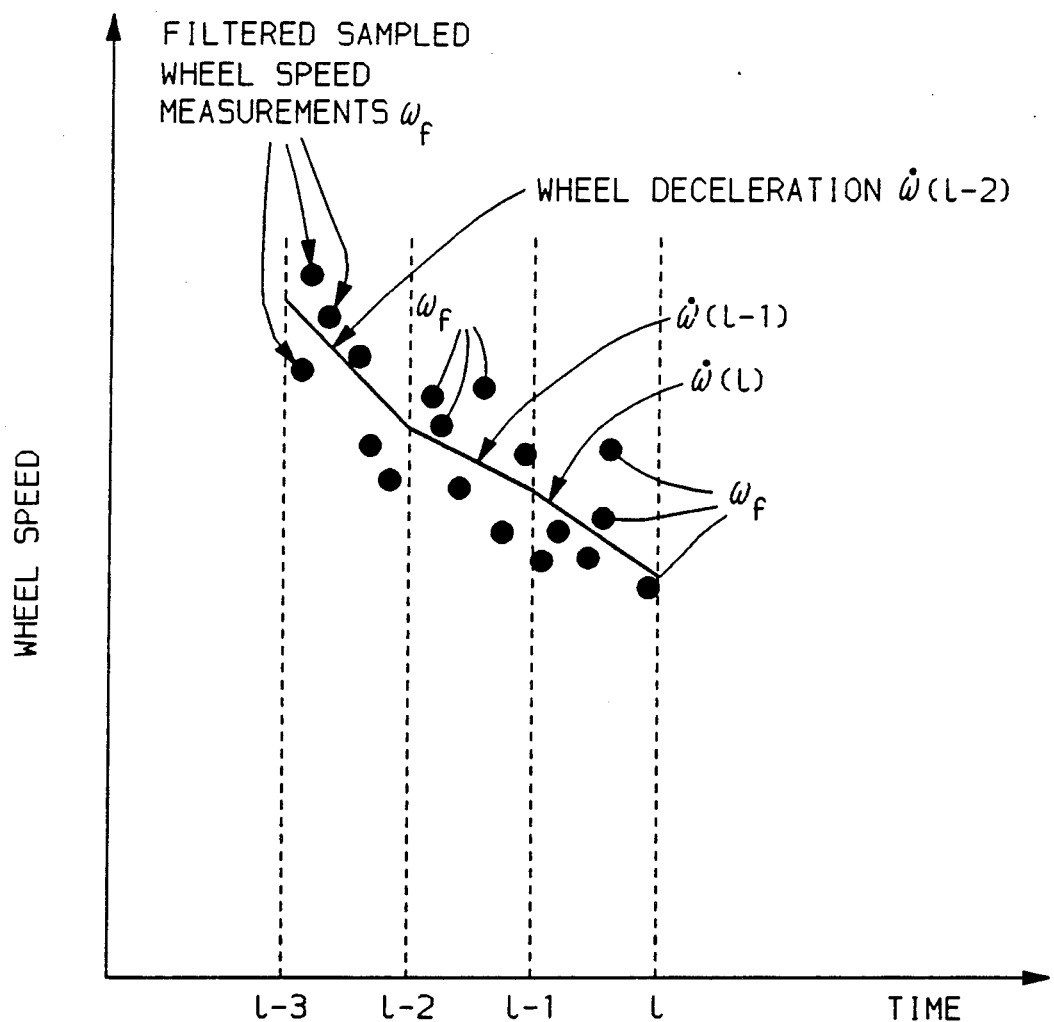
FIG. 4 is a diagram illustrating the sampling of wheel speed and the determination of wheel deceleration.

The foregoing is illustrated in FIG. 4 where three updating time cycles (1-3 to 1-2, 1-2 to 1-1 and 1-1 to 1) are shown. In this FIGURE, the present wheel deceleration $\dot{\omega}(1)$ determined at time 1 is based on a least squares fit of the previous 6 samples of filtered wheel speed $\omega_f$. Similarly, the wheel deceleration $\dot{\omega}(1-1)$ determined at time 1-1 is based on the preceding 6 samples of filtered wheel speed $\omega_f$. In the same manner, the wheel deceleration determined at time 1-2 is based upon the prior 6 measurements of filtered wheel speed $\omega_f$ occurring since the prior time 1-3.

Returning to FIG. 3, the foregoing is accomplished by the program beginning at step 30 where a sample count n representing the number of wheel speed interrupts for the wheel determined at step 28 since the end of the prior updating time cycle at time 1-1 is incremented at step 30. When the count n attains the predetermined value $K_n$, the predetermined number of samples of filtered wheel speed $\omega_f$ (such as 6) upon which wheel deceleration is to be based has been accumulated. At the next step 32, the instantaneous wheel speed $\omega(n)$ associated with the count n is determined followed by the determination of the filtered value of wheel speed $\omega_f(n)$ associated with the count n. In one embodiment, the instantaneous wheel speed $\omega(n)$ may be based upon the elapsed time between successive leading edges of the squarewave speed signal provided by the respective wheel speed interface and squaring circuit. This may be accomplished, for example, by use of a free-running counter clocked by the computer system clock. By sampling the count of the free-running counter at step 32 and comparing the count sampled at step 32 in the prior wheel speed interrupt for the determined wheel, the elapsed time between speed signals can be established upon which instantaneous speed is determined. The filtered wheel speed signal $\omega_f$ may then be determined by use of a standard digital low pass filter. This low pass filter reduces noise effects that result from measurement errors caused by environmental conditions and sensor inaccuracies.

Step 34 then determines if the count n has been incremented to the value $K_n$ defining the duration of the updating time cycle. If the count $K_n$ has not been attained, the program returns to the background loop 24 of FIG. 2. It should here be noted that the filtered wheel speed values $\omega_f$ determined at step 32 are stored in conjunction with the associated count n so as to provide a history of values of the filtered wheel speed measurements.

Returning to step 34, when the number of sampled filtered wheel speed values $\omega_f$ since the end of the last updating time cycle (1-1 of FIG. 4) attains the predetermined value $K_n$ such as 6 defining the present updating time cycle ending at time 1 illustrated in FIG. 4, the program proceeds to a step 38 where n is reset to initialize the routine to sample another set of filtered wheel speed values and then to step 40 where the $K_n$ values of the filtered wheel speed $\omega_f$ stored at step 32 are used to determine wheel deceleration $\dot{\omega}(1)$. Based upon the $K_n$ determined values of filtered wheel speed $\omega_f$ obtained in the updating time cycle just ended, the wheel deceleration is obtained by use of a linear least squares fit of the $K_n$ filtered measurements of wheel speed. This results in a determined wheel deceleration $\dot{\omega}(1)$ over the updating time cycle just ended.

The vehicle deceleration $\dot{\omega}_v(1)$ is then estimated by averaging the wheel decelerations determined in a predetermined constant number of updating time cycles such as 3. As viewed in FIG. 4, these time cycles are represented by 1-1 to 1, 1-2 to 1-1 and 1-3 to 1-2 and the three corresponding wheel deceleration values are $\dot{\omega}(1)$, $\dot{\omega}(1-1)$ and $\dot{\omega}(1-2)$. In other embodiments, the predetermined constant number of updating time cycles may be other numbers including unity.

The vehicle deceleration determined at step 42 is limited to a maximum possible vehicle deceleration value such as $-1$ g at steps 44 and 46. If the step 44 determines the value of vehicle deceleration is less than $-1$ g (the absolute magnitude being greater than 1 g), the value is limited at step 46 to $-1$ g. The current vehicle speed $\omega_v(1)$ is then estimated based upon the last estimated value $\omega_v(1-1)$ at the beginning of the updating time cycle just ended, the vehicle deceleration $\dot{\omega}_v(1)$ determined at step 42 and an interval $\Delta t$ defined by the period from time 1-1 to the present time 1 as illustrated in FIG. 4 and in accord with the expression $$\omega_v(1) = \dot{\omega}_v(1)\Delta t + \omega_v(1-1).$$

The estimated vehicle speed $\omega_v(1)$ is then utilized at the next step 50 to determine wheel slip S based upon the estimated vehicle speed $\omega_v(1)$ and the filtered wheel speed $\omega_f(1)$ in accord with the expression $$S = 1 - [\omega_f(1)/\omega_v(1)].$$

The program then determines whether or not the vehicle wheel is experiencing an incipient wheel lockup condition based upon the value of slip S determined at step 50. If the value of slip is greater than a threshold value $S_0$, an incipient wheel lockup condition is indicated. Conversely, if the slip determined at step 50 is less than $S_0$, the vehicle wheel is being braked in a stable braking region and an incipient wheel lockup condition does not exist. Assuming this is the case, the program proceeds to a step 54 where a "first time" flag is set. The state of this flag will be utilized as will be described to enable the estimation of vehicle deceleration and the adjustment of the estimated vehicle speed when an incipient wheel lock condition is first detected.

When the vehicle is being operated in the stable braking region where slip is less than the threshold $S_0$, the vehicle speed generally follows wheel speed and departs therefrom only when the wheel deceleration exceeds a maximum possible vehicle deceleration. As long as the wheel deceleration $\dot{\omega}(1)$ is greater than a deceleration value $-1$ g (the absolute magnitude being less than 1 g) indicating the vehicle speed tracks wheel speed, the estimated vehicle speed is adjusted toward the measured filtered wheel speed. This is accomplished by determining a factor $K_1$ at step 58 in accord with the expression $\alpha[1-(S/S_0)]$ where $\alpha$ is a calibration constant such as 0.2. The vehicle speed estimate is then adjusted at step 60 in accord with the expression $$\omega_v(1) = \omega_v(1) - K_1[\omega_v(1) - \omega_f(1)].$$

However, if the wheel deceleration becomes large and exceeds a maximum possible vehicle deceleration while the slip value is less than the critical slip value $S_0$, the estimated value of vehicle speed determined at step 48 is not adjusted and comprises the estimation of vehicle speed. From step 60 or step 56 if the wheel deceleration is not greater than $-1$ g, the program proceeds to a step 61 where the time reference count 1 is incremented. Thereafter, the routine returns to the background loop of FIG. 2.

The foregoing steps are repeatedly executed with each wheel speed interrupt to provide an estimate of vehicle speed for each of the vehicle wheels as long as the wheel whose speed signal initiated the interrupt request does not experience an incipient wheel lockup condition as detected at step 52. If, however, the brake pressure applied to the wheel brakes becomes excessive such that the slip determined at step 50 exceeds the threshold $S_0$ indicating an incipient wheel lockup condition, the program proceeds to estimate vehicle speed in accord with this invention to provide for an accurate indication of vehicle speed even though the wheel speed substantially departs from the actual vehicle speed.

Figure 5:
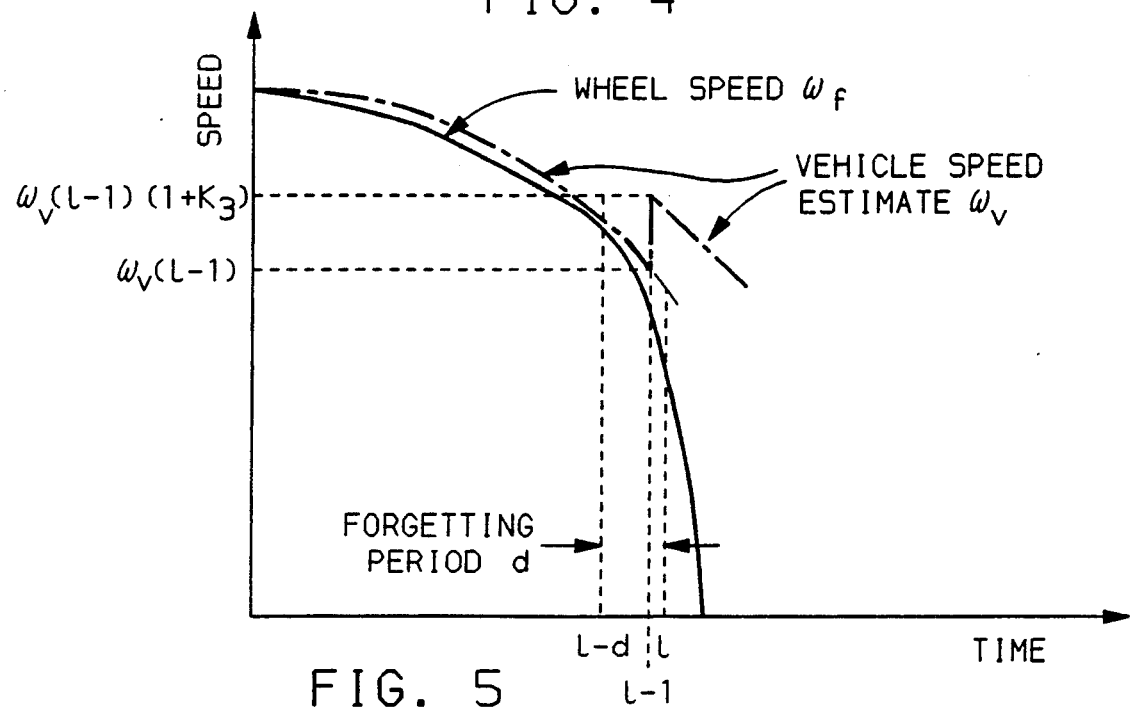
FIG. 5 is a diagram illustrating the estimation of vehicle speed in accord with the principles of this invention.

First referring to the diagram of FIG. 5, by the time an incipient lockup condition based on wheel slip is detected such as at time 1 (the end of the present updating time cycle), the estimated vehicle speed and the estimated vehicle deceleration substantially deviate from the actual wheel speed and wheel deceleration. To correct for the high vehicle deceleration estimate and low vehicle speed estimate, the most recent measured wheel deceleration values are not used to estimate vehicle deceleration since they represent a greater deceleration in comparison to the actual vehicle deceleration. Accordingly, a time period d, called a forgetting period in FIG. 5 is introduced where the routine ignores the most recent history of wheel deceleration and estimates the vehicle deceleration based on the wheel deceleration preceding the forgetting period d. The forgetting period is determined such that the vehicle deceleration based upon the wheel deceleration is substantially a true representation of the actual vehicle deceleration. In other words, the determined forgetting time period d identifies the point in time that the vehicle deceleration estimated at step 42 begins to deviate from the actual vehicle deceleration. From that point on, the estimated vehicle deceleration will remain constant and is generally dictated by the coefficient of friction between the wheel and the road surface.

In addition, to correct for the low value of the estimated vehicle speed resulting from the wheel speed decreasing at a rate faster than the actual vehicle speed, the vehicle speed previously estimated at the end of the prior updating time cycle (time 1-1), is increased by a percentage that may be a calibration constant in one embodiment or may be variable as a function of parameters such as the length of the forgetting period d and the average wheel deceleration during that period.

The foregoing is provided by the routine of FIG. 3 upon the detection of an incipient wheel lockup condition at step 52 when the calculated slip at step 50 exceeds the slip threshold $S_0$. Assuming this the case, the program determines at step 62 whether or not the vehicle speed estimated at step 48 is greater than a low threshold speed $\omega_{vmin}$. If not, the program proceeds to a step 64 where the first time flag previously described in regard to step 54 is set after which the program proceeds to step 61 to increment 1. However, if the estimated vehicle speed $\omega_v(1)$ is greater than the low threshold speed, the program proceeds from step 62 to a step 66 where the condition of the first time flag is sampled. If the flag is set indicating that the adjustment to vehicle deceleration and speed have not yet been made following a sensed incipient wheel lockup condition, the program proceeds to a step 68 where the forgetting time period d is determined. As previously described, the forgetting time period identifies the point in time at which the estimated vehicle deceleration based on wheel deceleration begins to deviate from the actual vehicle deceleration. This time period in one embodiment may be a constant. In another embodiment, the forgetting time period may be based on various parameters so as to more accurately predict the preceding time at which the estimated vehicle deceleration based on wheel deceleration deviates from the actual vehicle deceleration. These parameters may include wheel speed, the slip threshold $S_0$ and rate of change in brake line pressure (in an inverse relationship).

At the next step 70, the vehicle deceleration $\dot{\omega}_c$ to be used in the estimation of vehicle speed during the incipient wheel lock condition is obtained by determining the estimated vehicle deceleration at the time just preceding the forgetting period d. The value of $\dot{\omega}_c$ is set equal to the estimated vehicle deceleration $\dot{\omega}_v$ at time 1-d. This deceleration represents the slope of the vehicle speed estimate $\omega_v$ in FIG. 5 at time 1-d.

The adjustment to the estimated vehicle speed is made at step 72 to the estimated vehicle speed at the end of the prior updating time cycle (time 1-1 of FIGS. 4 and 5). The amount of the adjustment is established by a fraction $K_3$. This is accomplished by the expression $$\omega_v(1\text{-}1) = \omega_v(1\text{-}1)(1 + K_3)$$

where $K_3$ in one embodiment is a constant such as 0.2 and in another embodiment is made directly proportional to the length of the forgetting period d and the average wheel deceleration during that period.

At step 74, the first time flag is reset so that the steps 68–72 are bypassed during subsequent executions of the interrupt routine resulting from a wheel speed signal from the same wheel. While the flag is reset, the program proceeds directly from step 66 to a step 76 wherein the vehicle deceleration estimate to be used during an incipient lockup condition is set to some factor times the value determined at step 70. This factor $K_2$ may be a constant such as 0.95 and may be unity in another embodiment. Thereafter, vehicle speed is estimated at step 78 based upon the time integral of the estimated deceleration established at step 76 over the period of the updating time cycle in accord with the expression $$\omega_v(1) = \omega_v(1\text{-}1) + \dot{\omega}_c \Delta T$$

where $\Delta T$ is the duration of the updating time cycle from 1-1 to 1 as seen in FIGS. 4 and 5. Following this step, 1 is incremented at step 61 and the program returns to the background loop of FIG. 2. As long as the wheel is experiencing an incipient lockup condition as detected at step 52, the steps 76 and 78 are continuously repeated at each updating time cycle for the respective wheel. The resulting vehicle speed over time is illustrated in FIG. 5 whereat the slope of the vehicle speed signal is defined by the estimated vehicle deceleration $\dot{\omega}_C$ established at step 76.

The foregoing description of the preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of estimating vehicle speed during braking of a wheel of a vehicle traveling over a road surface, the wheel being braked by application of brake pressure to a wheel brake, the method comprising the steps of:
    sensing the speed of the wheel;
    determining the occurrence of an incipient wheel lock condition of the wheel in response to excessive slip between the wheel and the road surface;
    estimating vehicle speed prior to the determined occurrence of an incipient wheel lock condition based on the sensed wheel speed;
    determining a wheel deceleration value at a point in time preceding the determined occurrence of the incipient wheel lock condition whereat the wheel deceleration is a measure of the vehicle deceleration; and
    estimating the vehicle speed after the determined occurrence of an incipient wheel lock condition in accord with (a) the vehicle speed estimated prior to the determined occurrence of an incipient wheel lock condition and (b) the determined wheel deceleration value.

2. The method of claim 1 further including the step of determining the time preceding the determined occurrence of the incipient wheel lock condition whereat the wheel deceleration is a measure of the vehicle deceleration as a function of predetermined parameters.

3. The method of claim 2 wherein the predetermined parameters include wheel speed, rate of change in the brake pressure and the predetermined threshold.

4. The method of claim 1 wherein the occurrence of an incipient wheel lock condition is determined in response to excessive slip represented by a predetermined slip threshold.

5. A method of estimating vehicle speed during braking of a wheel of a vehicle traveling over a road surface, the wheel being braked by application of brake pressure to a wheel brake, the method comprising the steps of:
    sensing the speed of the wheel;
    determining the occurrence of an incipient wheel lock condition of the wheel in response to excessive slip between the wheel and the road surface;
    estimating vehicle speed prior to the determined occurrence of an incipient wheel lock condition based on the sensed wheel speed;
    determining a wheel deceleration value at a point in time preceding the determined occurrence of the incipient wheel lock condition whereat the wheel deceleration is a measure of the vehicle deceleration; and
    estimating the vehicle speed after the determined occurrence of an incipient wheel lock condition by (a) increasing the value of the vehicle speed estimated prior to the determined occurrence of an incipient wheel lock condition and (b) decreasing the increased value of the estimated vehicle speed at a rate in accord with the determined wheel deceleration value.

* * * * *